(12) United States Patent
Xu et al.

(10) Patent No.: US 6,891,994 B2
(45) Date of Patent: May 10, 2005

(54) MICRO OPTICAL DESIGN FOR DWDM INTERLEAVERS WITH NARROW CHANNEL SPACING

(75) Inventors: Xiaojie Xu, San Jose, CA (US); Kenneth A. Fesler, Sunnyvale, CA (US); Kaine Mildenberger, Davis, CA (US)

(73) Assignee: Stratos International, Inc., Chicago, IL (US)

( * ) Notice: Subject to any disclaimer, the term of this patent is extended or adjusted under 35 U.S.C. 154(b) by 179 days.

(21) Appl. No.: 10/274,728

(22) Filed: Oct. 21, 2002

(65) Prior Publication Data

US 2004/0076370 A1 Apr. 22, 2004

(51) Int. Cl.[7] .................................................. G02B 6/28
(52) U.S. Cl. ........................................ 385/24; 385/36
(58) Field of Search ............................ 385/14, 24, 33, 385/36; 359/494–496

(56) References Cited

U.S. PATENT DOCUMENTS

| | | | | |
|---|---|---|---|---|
| 5,231,405 A | * | 7/1993 | Riza | 342/375 |
| 5,606,439 A | * | 2/1997 | Wu | 349/117 |
| 6,183,092 B1 | * | 2/2001 | Troyer | 353/31 |
| 6,498,680 B1 | * | 12/2002 | Zhou et al. | 359/487 |
| 6,690,513 B2 | * | 2/2004 | Hulse et al. | 359/485 |
| 2002/0018300 A1 | * | 2/2002 | Ducellier | 359/629 |
| 2002/0126291 A1 | * | 9/2002 | Qian et al. | 356/450 |
| 2002/0154313 A1 | * | 10/2002 | Zhou | 356/450 |
| 2002/0154845 A1 | * | 10/2002 | Xie et al. | 385/11 |
| 2002/0180981 A1 | * | 12/2002 | Ducellier et al. | 356/491 |
| 2003/0002809 A1 | * | 1/2003 | Jian | 385/73 |
| 2003/0039437 A1 | * | 2/2003 | Boord et al. | 385/24 |
| 2003/0058535 A1 | * | 3/2003 | Matsuura et al. | 359/494 |
| 2003/0218757 A1 | * | 11/2003 | Hill | 356/500 |
| 2003/0231391 A1 | * | 12/2003 | Xie et al. | 359/497 |
| 2003/0234935 A1 | * | 12/2003 | Liang et al. | 356/450 |

OTHER PUBLICATIONS

U.S. Provisional application No. 60/228,222.
U.S. Provisional application No. 60/327,231.
U.S. application Ser. No. 09/952,286.

* cited by examiner

Primary Examiner—Ellen E. Kim
(74) Attorney, Agent, or Firm—Karl D. Kovach

(57) ABSTRACT

A device includes a first fiber collimator, a second fiber collimator, a third fiber collimator, a first beam splitting prism, a second beam splitting prism, a spacer, a resonator cube, and a dielectric beam splitting coating. The dielectric beam splitting coating separates the second beam splitting prism from the resonator cube. The spacer and the first fiber collimator straddle the first beam splitting prism. The first beam splitting prism and the second beam splitting prism straddle the spacer. The second fiber collimator and the spacer straddle the second beam splitting prism. The third fiber collimator and the spacer straddle the second beam splitting prism.

30 Claims, 7 Drawing Sheets

MICRO OPTICAL DESIGN FOR DWDM INTERLEAVERS WITH NARROW CHANNEL SPACING

This non-provisional application claims the priority of the earlier filed U.S. Provisional Patent Application Ser. No. 60/348,916, filed Oct. 19, 2001.

CROSS-REFERENCE TO RELATED APPLICATIONS

This non-provisional application hereby incorporates herein by reference U.S. patent application Ser. No. 09/952,286, filed Sep. 14, 2001, entitled "Cascaded Optical Multiplexer," by Xiaojie Xu, and U.S. Provisional Patent Application Ser. No. 60/327,231, filed Oct. 4, 2001, entitled "Group Delay Dispersion Free Interleaver," by Xiaojie Xu, et al.

BACKGROUND OF THE INVENTION

1. Field of the Invention

The present invention pertains to the field of optics. The invention more particularly concerns an optical device used in fiber optic communication systems to combine or separate optical signals in an optical fiber and is known as an interleaver.

2. Discussion of the Background

An interleaver can be used to double the number of available channels in a WDM (wavelength division multiplexing) system. U.S. patent application Ser. No.09/952,286 discloses an interleaver design based on cascaded Mach-Zehnder interferometers (MZI). As shown in FIG. 1, micro-optic nonpolarizing beam splitting prisms 13, 14, 18, 19, 23, 24, 28, 29 and precision glass spacers 17, 22, 27 are used to construct such an interleaver 10. A dielectric beam splitting coating 15 separates prism 13 from prism 14. Likewise, dielectric beam splitting coating 20 separates prism 18 from prism 19, dielectric beam splitting coating 25 separates prism 23 from prism 25, and dielectric beam splitting coating 30 separates prism 28 from prism 29. The dielectric beam splitting coatings 15, 20 split incident light into two paths where each path has approximately fifty percent of the optical power of the incident light. The dielectric beam splitting coatings 25, 30 transmit approximately ninety-six percent of the incident light and reflects the remaining approximately four percent of the incident light.

The interleaver 10 also includes adjusting plates 16, 21, 26 all of which have an optical path length, $d_1$. The precision glass spacer 17 has an optical path length, $L_o+d_1$. The precision glass spacer 22 has an optical path length, $2L_o+d_1$. The precision glass spacer 27 has an optical path length, $4L_o+d_1$. A coupling lens 12 is attached to an optical fiber 11, a coupling lens 31 is attached to an optical fiber 33, and a coupling lens 32 is attached to an optical fiber 34.

The arrow adjacent to the optical fiber 11 shows the direction of the propagation of the light signal contained therein. The light signal contained within optical fiber 11 consists of many light signals of both even and odd channels. The light signal 2 emerges from the coupling lens 12 and enters the combination of prisms 13, 14 along with the dielectric beam splitting coating 15. Upon exiting the combination of prisms 13, 14 the light signal is separated into two paths 3, 4. The light traveling along path 3 travels through the adjusting plate 16 and then enters the combination of prisms 18, 19. The light traveling along path 4 travels through the precision glass spacer 17 and then enters the combination of prisms 18, 19. The light signals continue to travel through the remaining prisms 23, 24 and 28, 29 of the interleaver 10 in a similar manner until the exit the last combination of prisms 28, 29 along paths 5, 6. The even channel data of light signals travel along path 5 and into coupling lens 31 and then into optical fiber 33 in the direction of the arrow adjacent to optical fiber 33. The odd channel data of light signals travel along path 6 and into coupling lens 32 and then into optical fiber 34 in the direction of the arrow adjacent to optical fiber 34.

The design of interleaver 10 is well suited for interleaving/de-interleaving WDM channels with moderate channel spacing. For very dense channel spacing, the required thickness of the precision glass spacers 17, 22, 27 is large, which in turn leads to difficulties in alignment and a large package size. For example, assuming the refractive index of the precision glass spacer is 1.5, for 12.5 GHz channel spacing the required thickness for spaces 17, 22, and 27 in FIG. 1 is 25, 50 and 100 mm, respectively.

FIG. 2 shows a conventional planar waveguide interleaver 40 that combines a ring resonator 44 (the equivalent of a GTI interferometer) inside a MZI 45. The interleaver has an input signal which travel along optical fiber or waveguide 41. The input signal includes even and odd signals, $\lambda_1, \lambda_2, \ldots, \lambda_n$, and travels in the direction of the arrow which is adjacent to the waveguide 41. The waveguide 41 enters a coupler 42 where two waveguides 49, 50 emerge from the coupler 42. The coupler 42 has a three dB loss and evenly splits the input signal traveling in waveguide 41 between waveguides 49, 50. Waveguide 50 enters an unbalanced MZI 45 which has an optical path length difference, $\Delta L$. A waveguide 52 exits a delay element 53 of the unbalanced MZI 45. Waveguide 49 enters a coupler 43, and an optical resonator 44 is also attached to the coupler 43. The resonator 44 has an optical path length, $2\Delta L$. The coupler 43 has a beam splitting ratio that transmits between eighty to ninety percent of the incident light while it reflects between ten to twenty percent of the incident light. Emerging from coupler 43 is a waveguide 51. Waveguides 51, 52 enter coupler 46. In terms of performance, the coupler 46 is substantially the same as coupler 42. Waveguides 47, 48 emerge from coupler 46. One output signal travels in waveguide 47 and contains the odd channels, $\lambda_1, \lambda_3, \lambda_5, \ldots, \lambda_{odd}$. Another output signal travels in waveguide 48 and contains the even channels, $\lambda_2, \lambda_4, \lambda_6, \ldots, \lambda_{even}$.

The drawback of this design of waveguide form 40 is that the size of the resonator 44 is limited by the bending loss of the waveguide. In order to minimize losses, waveguide bending should be keep at a radius larger than the critical bending radius of the waveguide. A typical waveguide has a minimum bending radius in the range of 10 to 30 mm. However, for a 12.5 GHz WDM interleaver, the required radius for the ring resonator 44 is only about 1.50 mm, assuming the refractive index of the waveguide is about 1.50.

Interleavers based on this structure 40 have a near square top spectrum response curve which is desirable for DWDM applications. FIG. 3 shows the spectrum response curve of such a structure 40 which is a plot of power loss measured in dBs versus wavelength measured in microns.

FIG. 4 shows a conventional micro-optic interleaver 60 that combines a GTI resonator with a Michelson interferometer. The Michelson interferometer 65 includes a beam splitting cube 66, and two one-hundred percent reflection mirrors 67, 68. The splitting cube 66 includes two prisms 73, 74. The GTI resonator includes the one-hundred prevent reflection mirror 67 and a dielectric coating 71 applied to the beam splitting cube 66, and the one-hundred percent reflection mirror 68 and a dielectric coating 72 applied to the beam splitting cube 66. The beam splitting cube 66 evenly splits an incident optical signal into two resultant optical signals. One reflection mirror 67 is positioned a distance, 2t, away from one dielectric coating 71 and the other reflection mirror 68 is positioned a distance, t, away from the other dielectric coating 72. Each dielectric coating 71, 72 transmits between eighty to ninety percent of the light incident thereon while they each reflect between ten to twenty percent of the light incident thereon. Waveguides 61, 63, and 75 are optically connected to a circulator 62. Waveguide 75 is also optically connected to a single mode fiber collimator 64. Waveguide 70 is optically connected to a single mode fiber collimator 69.

The arrows indicate the direction of propagation of the light signals within the device 60. The input signal includes even and odd signals, $\lambda_1, \lambda_2, \ldots, \lambda_n$, and travels in the direction of the arrow which is adjacent to the optical fiber or waveguide 61. One output signal travels in waveguide 63 and contains the even channels, $\lambda_2, \lambda_4, \lambda_6, \ldots, \lambda_{even}$, and travels in the direction of the arrow which is adjacent to the waveguide 63. Another output signal travels in waveguide 70 and contains the odd channels, $\lambda_1, \lambda_3, \lambda_5, \ldots, \lambda_{odd}$, and travels in the direction of the arrow which is adjacent to the waveguide 70.

Here, the GTI resonator and the Michelson interferometer provide similar functions as the ring resonator 44 and MZI interferometer 45 shown in FIG. 2. Because the spacing in the GTI resonator can be made with thicknesses ranging from a few tens of microns to a few tens of millimeters, this configuration can be used for interleaving/de-interleaving WDM signals with normal channel spacing (typically 12.5 GHz to 200 GHz). However, since both the GTI resonator and Michelson interferometer are operated in reflection mode, alignment is more demanding, and one of the de-interleaved data streams is reflected back into the input port and is then extracted using an optical circulator 62. The use of an optical circulator 62 not only increases the complexity and cost of the device, but also introduces a higher insertion loss.

Thus, there is a need for an interleaver which has narrow channel spacing, wide and flat top passband spectral response, low cross talk, and components which are easy to align relative to one another, components which are easy to manufacture, and components which are easy to assemble as compared to known interleavers.

SUMMARY OF THE INVENTION

Therefore, it is an object of the invention to provide a device having components which are easy to align.

It is another object of the invention to provide a device which is easy to assemble.

It is still yet another object of the invention to provide a device which has components which are easy to manufacture.

In one form of the invention, the device includes a first fiber collimator, a second fiber collimator, a third fiber collimator, a first beam splitting prism, a second beam splitting prism, a spacer, a resonator cube, and a dielectric beam splitting coating. The dielectric beam splitting coating separates the second beam splitting prism from the resonator cube. The spacer and the first fiber collimator straddle the first beam splitting prism. The first beam splitting prism and the second beam splitting prism straddle the spacer. The second fiber collimator and the spacer straddle the second beam splitting prism. The third fiber collimator and the spacer straddle the second beam splitting prism.

In yet another form of the invention, the device includes a first fiber collimator, a second fiber collimator, a third fiber collimator, a first beam splitting prism, a second beam splitting prism, a spacer, a resonator cube, a dielectric beam splitting coating, a first delay element, a second delay element. The dielectric beam splitting coating separates the second beam splitting prism from the resonator cube. The second delay element is separated from the first delay element by a first distance. The resonator cube includes a first ninety degree prism and a second ninety degree prism. The first ninety degree prism is separated from the second ninety degree prism by a second distance. The spacer and the first fiber collimator straddle the first beam splitting prism. The first beam splitting prism and the second beam splitting prism straddle the spacer. The second fiber collimator and the spacer straddle the second beam splitting prism. The third fiber collimator and the spacer straddle the second beam splitting prism. The first delay element and the second beam splitting prism straddle the spacer.

In yet another form of the invention, the device includes a first substrate, a second substrate, a third substrate, a first fiber collimator, a second fiber collimator, a third fiber collimator, a first beam splitting prism, a second beam splitting prism, a spacer, a resonator cube, a dielectric beam splitting coating, a first delay element, a second delay element. The dielectric beam splitting coating separates the second beam splitting prism from the resonator cube. The second delay element is separated from the first delay element by a first distance. The resonator cube includes a first ninety degree prism and a second ninety degree prism. The first ninety degree prism is separated from the second ninety degree prism by a second distance. The first beam splitting prism, the first delay element, the spacer, the second beam splitting prism, the second ninety degree prism of the resonator cube, the first fiber collimator, the second fiber collimator, and the third fiber collimator are attached to the first substrate. The second substrate has a free end and a fixed end. The fixed end of the second substrate is attached to the first substrate. The free end of the second substrate is attached to the second delay element. The third substrate has a free end and a fixed end. The fixed end of the third substrate is attached to the first substrate. The free end of the third substrate is attached to the first ninety degree prism of the resonator.

Thus, the present invention provides a micro-optical interleaver/de-interleaver suitable for DWDM telecommunication applications where small channel spacing, for example, less than 50 GHz, is required. The interleaver in this design has narrow channel spacing, wide and flat top passband, low cross talk, and is compact and easy to align and manufacturing. Furthermore, another embodiment of the invention provides a passive temperature compensation scheme, so that the interleaver can be used without active temperature control.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 5:
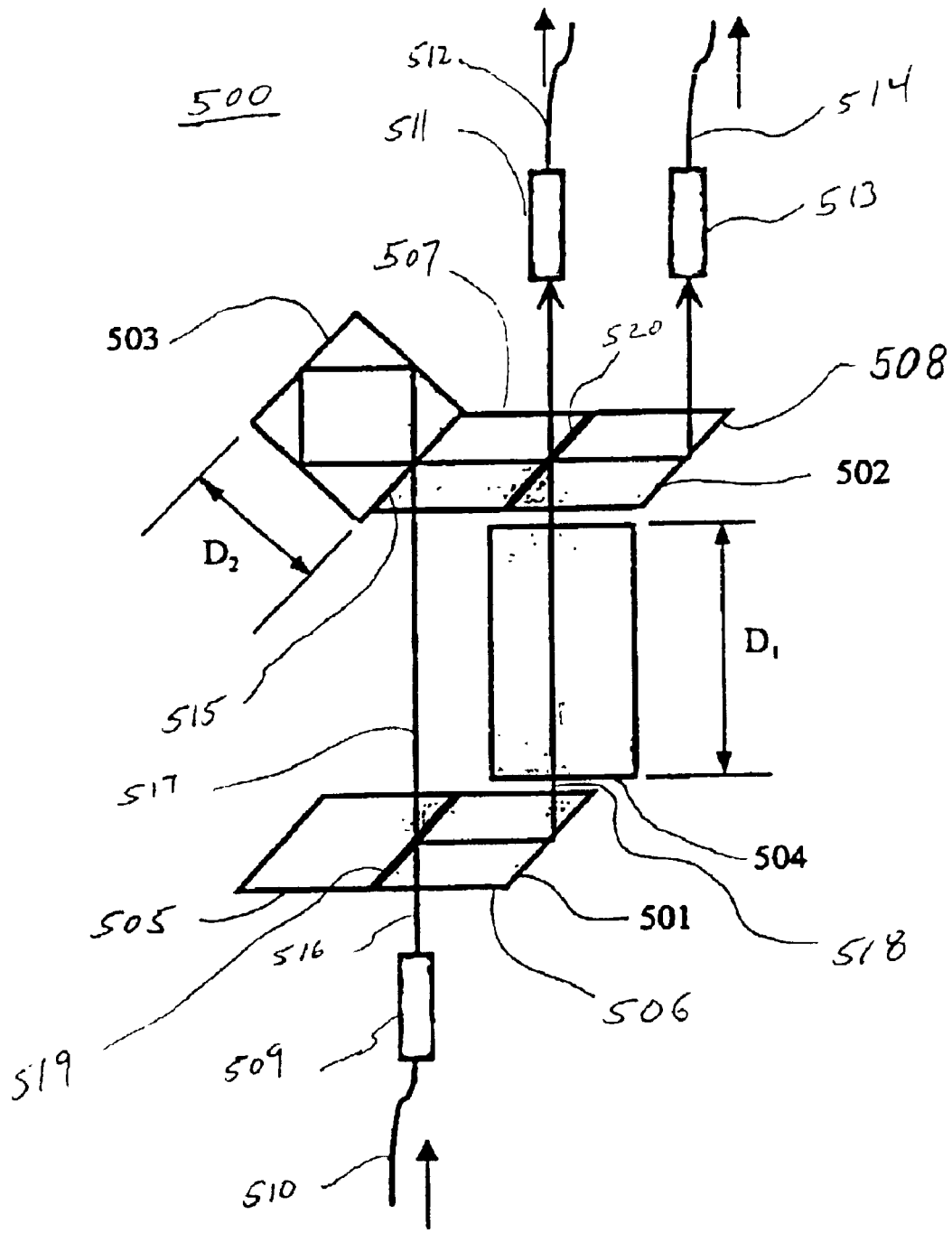
FIG. 5 is a schematic illustration of an interleaver consistent with an embodiment of the present invention.

Referring now to the drawings, wherein like reference numerals designate identical or corresponding parts throughout the several views, and more particularly to FIG. 5 thereof, is a device 500.

Figure 1:
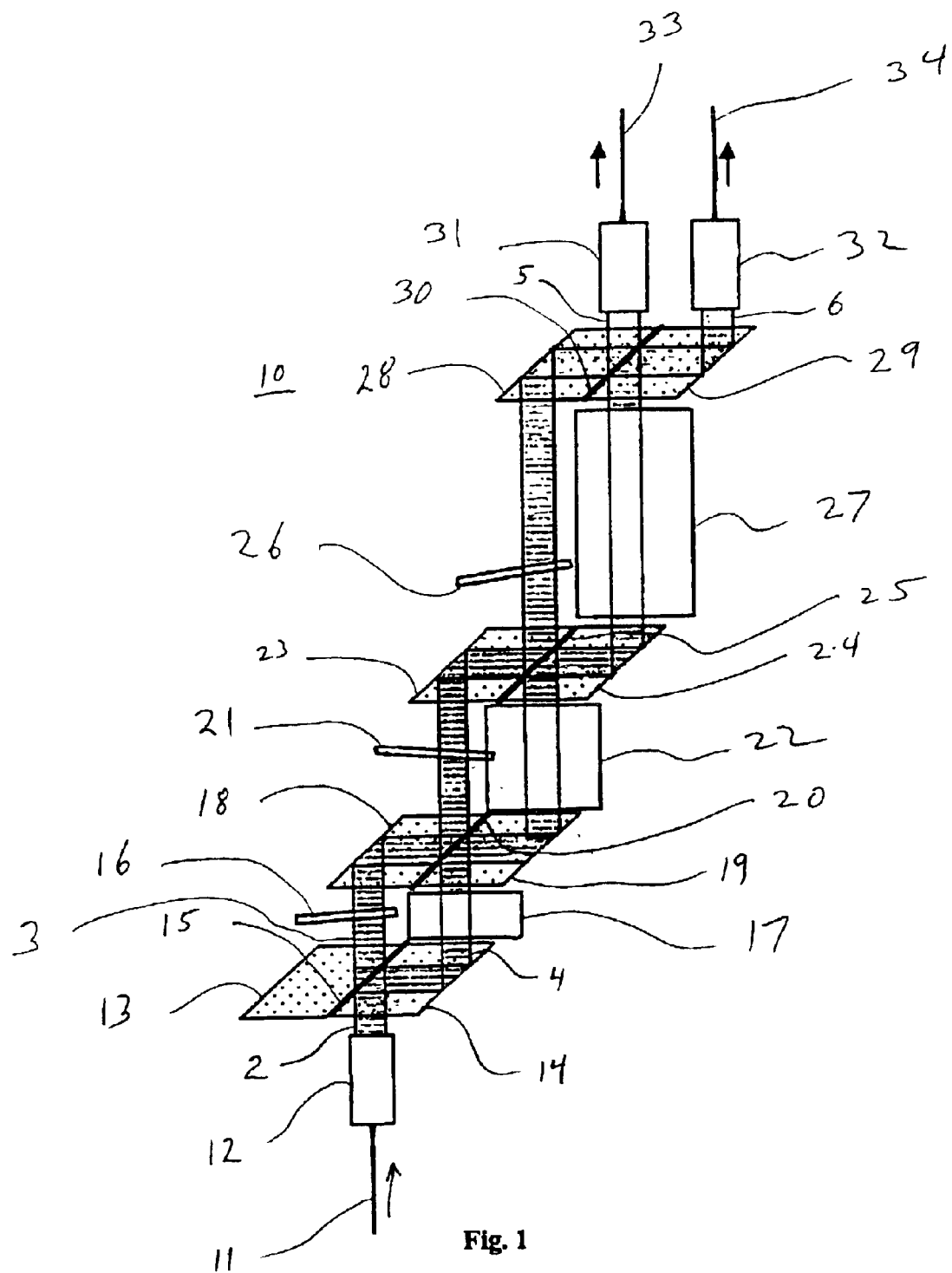
FIG. 1 is a schematic illustration of a cascaded optical multiplexer.
Figure 2:
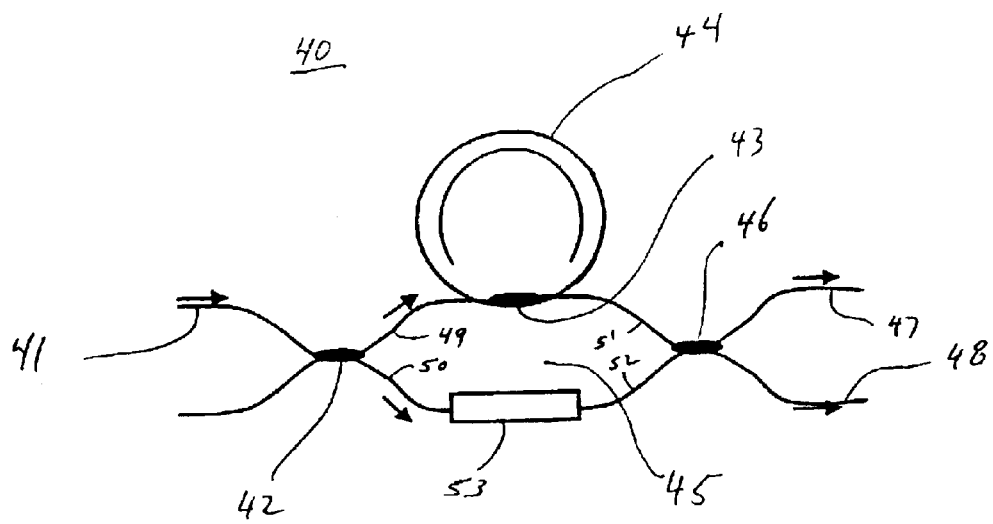
FIG. 2 is a schematic illustration of a conventional planar waveguide interleaver.
Figure 3:
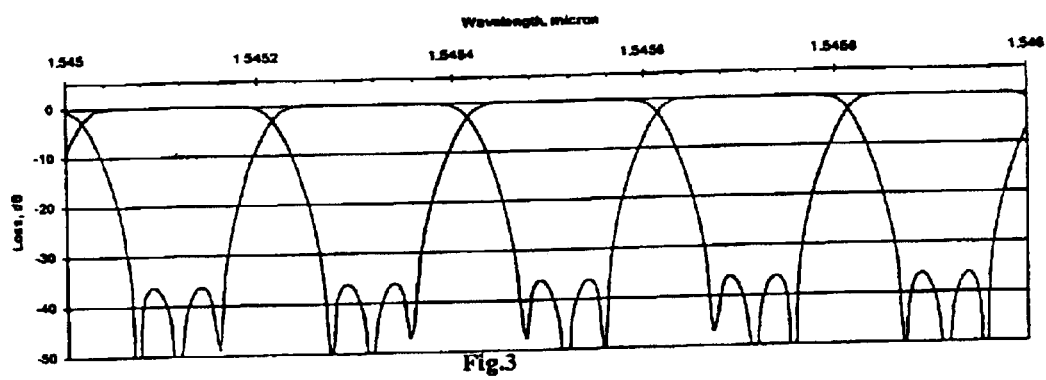
FIG. 3 is a spectrum response graph for the planar waveguide of FIG. 2.
Figure 4:
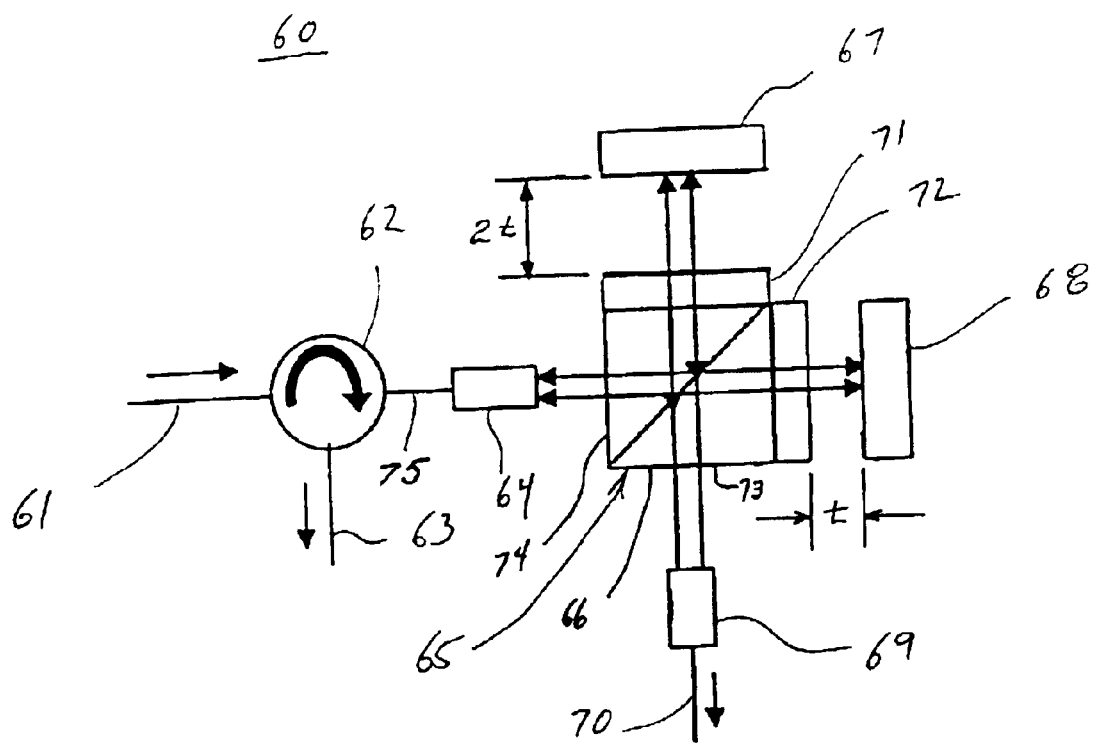
FIG. 4 is a schematic illustration of a conventional micro-optic interleaver.

FIG. 5 is a schematic illustration of an embodiment of the present invention in the form of device 500. Two non-polarizing beam splitter or splitting prisms 501 and 502 with optical power splitting ratios that are approximately fifty/fifty are used to construct a Mach-Zehnder interferometer (MZI), and an optical glass cube 503 is used to form an optical resonator. The beam splitting prism 501 is constructed of prisms 505, 506, and beam splitting prism 502 is constructed of prisms 507, 508, where the construction of such beam splitting prisms is similar to the construction of the beam splitting prisms of the device of FIG. 1. Thus, prism 505 is separated from prism 506 by a dielectric beam splitting coating 519, and prism 507 is separated from prism 508 by a dielectric beam splitting coating 520.

A fiber collimator 509 is attached to an optical fiber or waveguide 510. The arrow adjacent to the waveguide 510 indicates the direction of travel of the input optical signal, $\lambda_1, \lambda_2, \lambda_3 \ldots, \lambda_n$, which contains a plurality of different wavelengths of light including even and odd channels or wavelengths. A fiber collimator 511 is attached to an optical fiber or waveguide 512. The arrow adjacent to the waveguide 512 indicates the direction of travel of the odd channels of the output signal, $\lambda_1, \lambda_3, \lambda_5, \ldots, \lambda_{odd}$. Another fiber collimator 513 is attached to an optical fiber or waveguide 514. The arrow adjacent to the waveguide 514 indicates the direction of travel of the even channels of the output signal, $\lambda_2, \lambda_4, \lambda_6, \ldots, \lambda_{even}$.

The input optical signal contained within waveguide 510 emerges from fiber collimator 509 as input light signal 516 and enters beam splitting prism 501. Before exiting the beam splitting prism 501, the input light signal 516 is separated into two paths 517, 518. The light signal traveling along path 517 travels toward the dielectric beam splitting coating 515. The light signal traveling along path 518 travels toward and through the precision glass spacer 504 and enters the beam splitting prism 502. The remaining arrows shown in FIG. 5 indicate the direction of travel of the light signals.

An optical path length difference $\Delta L_1$ in the MZI is introduced by a precision glass spacer 504 having a thickness, $D_1$, and a refractive index, $n_{glass-1}$, where:

(1) $\Delta L_1 = (n_{glass-1}) \cdot D_1$

The optical resonator cube has a dimension, $D_2$, and a refractive index, $n_{glass-2}$, so that the optical path length $L_2$ in the resonator is:

(2) $L_2 = 2 \cdot \Delta L_1 2\sqrt{2} \cdot n_{glass-2} \cdot D_2$

The optical resonator cube 503 is attached to the second nonpolarizing beam splitting prism 502 by optical cementing, adhesive-free bonding, or other appropriate manner. The interface between beam splitting prism 502 and the optical resonator cube 503 is coated with a lossless dielectric nonpolarizing beam splitting coating 515 having optical power splitting ratio where approximately between eighty to ninety percent of the incident light is transmitted, while approximately between ten to twenty percent of the incident light is reflected.

The reflecting and beam splitting surfaces are pre-aligned by the precision process of fabricating the beam splitting prisms 501, 502 and resonator cube 503. The device 500 operates in a transmission mode, so alignment of the parts 501, 502, 503, 504 is relatively easy and the output ports 511, 513 are separated from the input port 509. Typically, the prisms 501, 502, spacer 504, and cube 503 are made from optical grade glass.

Embodiments of the present invention are suitable for WDMs with relatively narrow channel spacing. For example, assuming the refractive index of the glasses is about 1.50, the dimension, $D_2$, of the optical resonator cube 503 is approximately 2.5 to 3.0 mm and 5.0 to 6.0 mm for 25 and 12.5 GHz channel spacing, respectively. For WDMs with relatively large channel spacing, such as 100 and 200 GHz, the dimension of the optical resonator cube 503 is in the range of a few hundred microns, which is apparently too small to fabricate and assemble.

As shown in equations (1) and (2), both the optical path lengths $\Delta L_1$ and $L_2$ are dependent on the refractive index of the optical glasses. Because of material dispersion, the refractive indices of glasses are dependent on the wavelength, $\lambda$, of the incident light. In order to improve the performance of a specific embodiment of the present invention throughout the working wavelength range, two different glasses with different material dispersions are used to make the precision glass spacer 504 and the optical resonator cube 503. The dependence of the refractive indices on wavelength of these two glasses is:

$$\frac{dn_{glass-1}}{d\lambda} = \frac{n_{glass-1} - 1}{n_{glass-2}} \cdot \frac{dn_{glass-2}}{d\lambda} \approx \frac{1}{3} \cdot \frac{dn_{glass-2}}{d\lambda} \quad (3)$$

Analysis of equation (3) shows that glass-2 is three times more dispersive in the 1400 to 1600 nm wavelength range. It is difficult to find two conventional optical glasses that meet the dispersion requirement in equation (3), because most of these glasses have similar dispersion in the 1400 to 1600 nm wavelength range.

Figure 6:
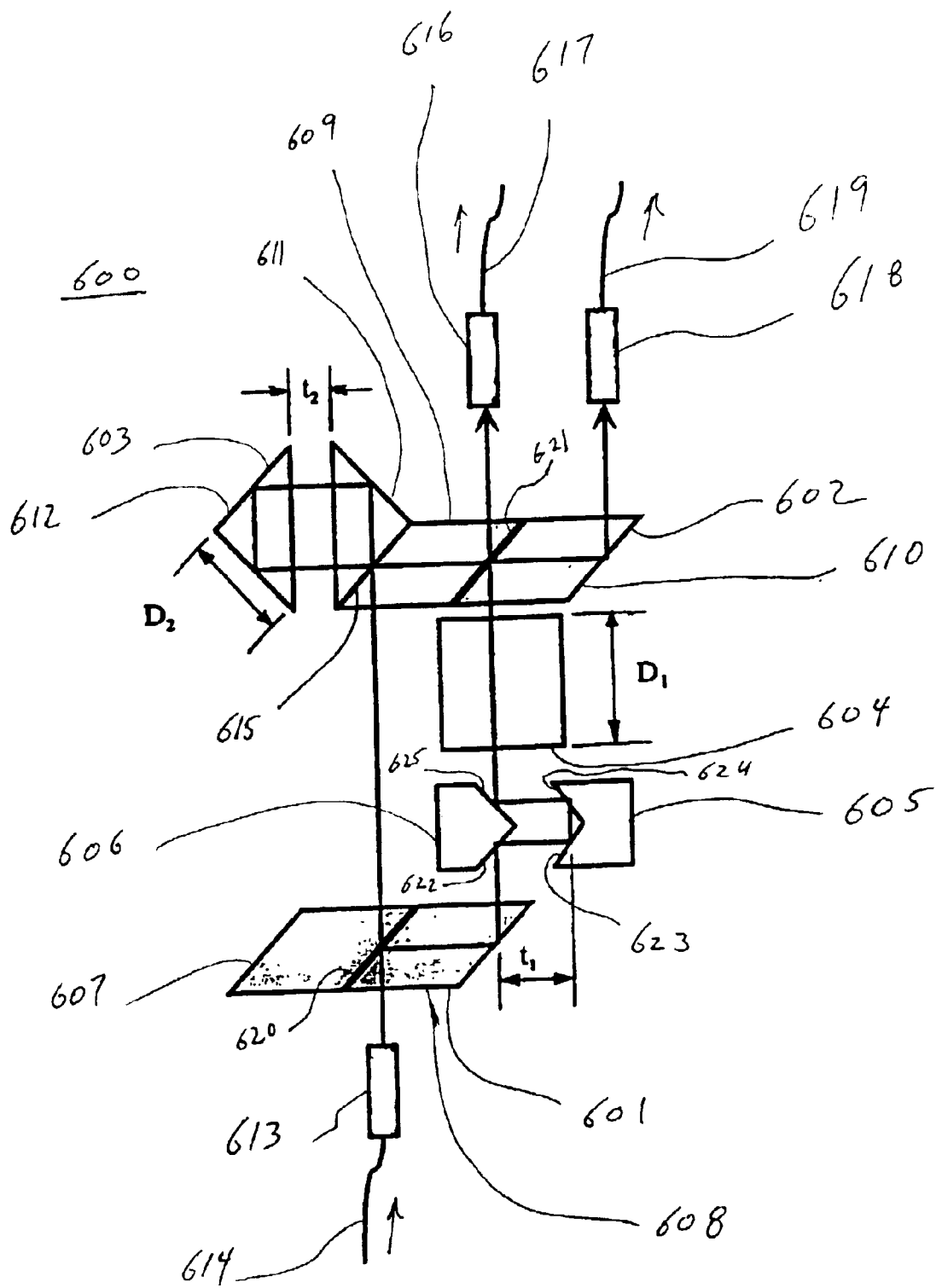
FIG. 6 is a schematic illustration of an interleaver consistent with another embodiment of the present invention, where the interleaver incorporates air gaps.

Another embodiment of the invention is shown in FIG. 6 as device 600. FIG. 6 is a schematic illustration of the device 600 where air gaps $t_2, t_1$ are included in both the optical resonator 603 and the MZI phase delay element 605, 606, respectively, as compared to the device 500 of FIG. 5. Fiber collimators 614, 616, 618 are the same as fiber collimators 510, 511, 513, respectively of FIG. 5. Waveguides or optical fibers 614, 617, 619 are the same as waveguides 510, 512, 514, respectively, of the previous embodiment. Beam splitting prisms 601, 602 are the same as beam splitting prisms 501, 502, respectively, of the previous embodiment. Beam splitting prism 601 includes prisms 607, 608, which are separated from each other with a dielectric beam splitting coating 620. Beam splitting prism 602 includes prisms 609, 610, which are separated from each other with dielectric beam splitting coating 621. Beam splitting prism 602 is separated from the optical resonator 603 by a dielectric beam splitting coating 615.

Functionally, the spacer 504 of the device 500 of FIG. 5 is the same as the combination of delay elements 606, 605, and the spacer 604 of the device 600 of FIG. 6. The length of time it takes a light signal to travel through optical elements 604, 605, 606 depends on the thickness of the spacer 604 and the distance between the reflecting surfaces of the delay elements 605, 606. As shown in FIG. 6, a light signal emanating from beam splitter 602 is redirected off of a first reflecting surface 622 of delay element 606 at an angle of ninety degrees relative to the angle of incidence. The light signal is then projected toward and reflected off of a first reflecting surface 623 of delay element 605 where the light path is redirected ninety degrees relative to the angle of incidence. The light signal continues on toward a second reflecting surface 624 of delay element 605 where the light path is redirected ninety degrees relative to the angle of incidence. The light signal is then projected on and reflected off of a second reflecting surface 625 of delay element 606 where the light path is redirected ninety degrees relative to the angle of incidence. The light signal continues on then through the glass spacer 604. The delay elements 605, 606 can be adjusted relative to one another so as bring the reflecting surfaces 622, 625 of delay element 606 either closer to or farther away from the reflecting surfaces 623, 624 of delay element 605, thus, either increasing or decreasing the optical path length. In this embodiment, the optical path length difference, $\Delta L_1$, in the MZI is:

$$\Delta L_1 = (n_{glass} - 1) \cdot D_1 + 2t_1 \quad (4)$$

where, $t_1$ is the air gap between delay elements 605, 606 as shown in FIG. 6;

$D_1$ is the thickness of glass spacer 604 as shown in FIG. 6; and $n_{glass}$ is the refractive index of the glass.

Functionally, the optical resonator cube 503 of the device 500 of FIG. 5 is the same as the optical resonator 603 of device 600 of FIG. 6. In the device 600, the optical resonator cube has been cut into two parts or prisms 611, 612. The prisms 611, 612 can be either placed closed together or far apart from each other, or placed at any point in between the two extremes. Once the two prisms 611, 612 are separated from one another, they are separated by a distance or air gap $t_2$, thus, either increasing or decreasing the path length of the optical signal traveling thereon. The optical path length $L_2$ in the optical resonator is:

$$L_2 = 2 \cdot \Delta L_1 = 2\sqrt{2} \cdot n_{glass} \cdot D_2 + 2t_2 \quad (5)$$

where, $t_2$ is the air gap between the two ninety degree prisms 611, 612;

$D_2$ is a dimension of the optical resonator 603; and $n_{glass}$ is the refractive index of the glass.

The spacer 604 and the optical resonator cube 603 may be made of the same optical glass, such as BK7, fused silica, and etc.

By setting $D_1 = \sqrt{2} \cdot D_2$, the relationship of $L_2 = 2\Delta L_1$ holds throughout the wavelength range, because the dispersion of air is negligible and thus:

$$\frac{d(L_2 - 2 \cdot \Delta L_1)}{d\lambda} = \frac{dL_2}{d\lambda} - 2 \frac{d(\Delta L_1)}{d\lambda} = 2\sqrt{2} \, D_2 \cdot \frac{dn}{d\lambda} - 2D_1 \cdot \frac{dn}{d\lambda} = 0 \quad (6)$$

Therefore the interleaver 600 works properly throughout the wavelength range of interest.

The air gaps $t_1$ and $t_2$ of the device 600 as shown in FIG. 6 also provide the freedom to precisely adjust the optical path length $\Delta L$, and $L_2$. The ability to accurately adjust the optical path length in both the MZI and the optical resonator 603 is important because of tolerances in the optical fabrication process and small variations in the refractive index of the optical glass.

It is also preferred that the performance of the interleaver be insensitive to environmental temperature; otherwise an expensive active temperature control scheme may be required. It is well known that both the refractive index and physical dimension of a conventional optical glass change with temperature. Since optical glasses are used to construct the optical resonator cube 603 and the phase delay elements 605, 606 in the MZI, the optical path length is thus dependent on the temperature. Typically, the optical path length increases with increasing temperature due to the dn/dT and thermal expansion of the optical glass. To compensate the optical path length change in the optical resonator 603 and the phase delay elements 605, 606 in the MZI for temperature changes, a passive thermal mechanical compensation scheme has been devised. As in FIG. 5, the arrows in FIG. 6 indicate the direction of propagation of the optical signals.

Figure 7:
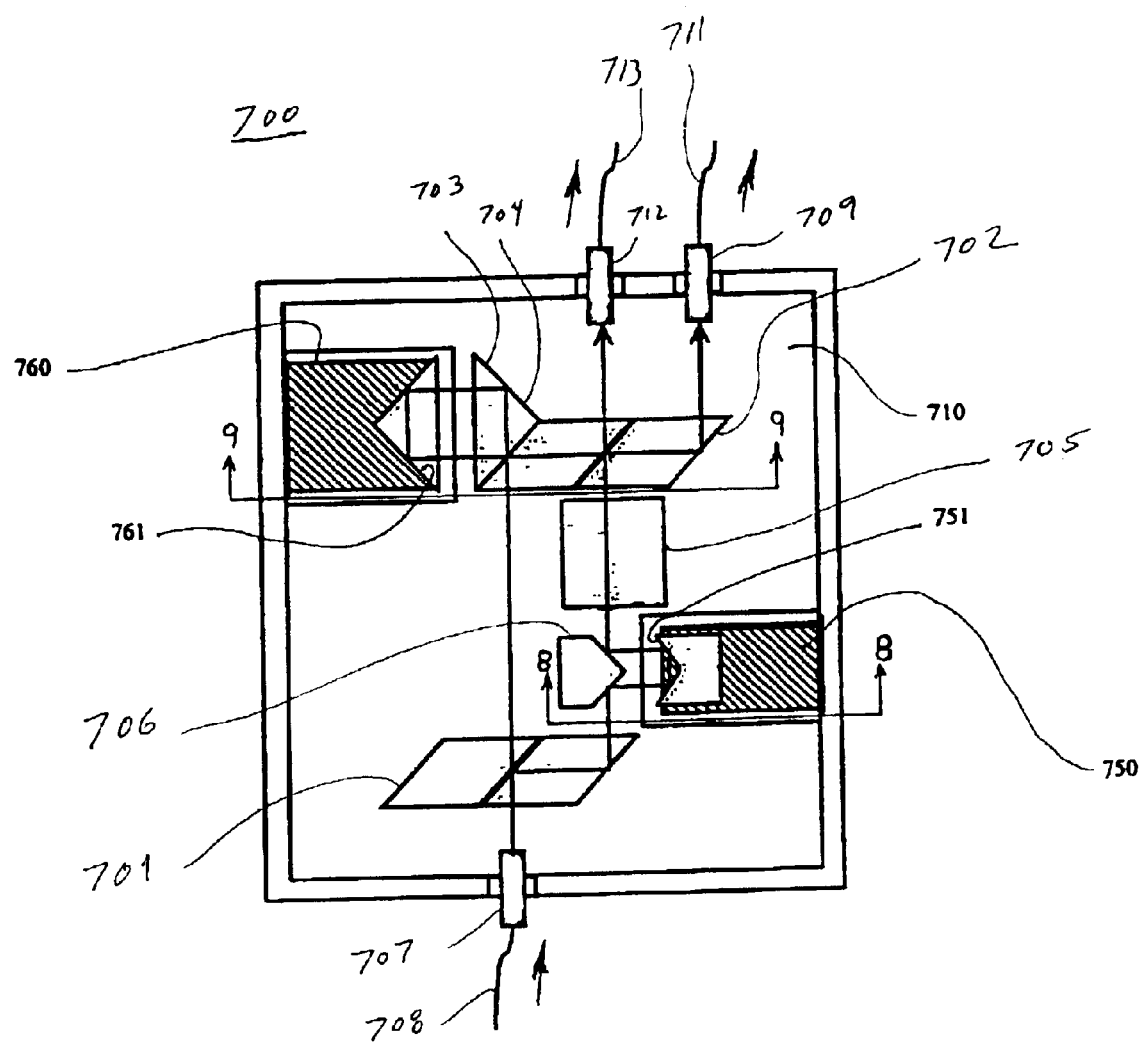
FIG. 7 is a schematic illustration of an interleaver consistent with yet another embodiment of the present invention, where the interleaver includes a temperature compensation scheme.

Yet another embodiment of the invention is shown in FIG. 7 as device 700. Device 700 incorporates the temperature compensation scheme as above described. Fiber collimators 707, 709, 712 are the same as fiber collimators 613, 618, 616, respectively of FIG. 6. Waveguides or optical fibers 708, 711, 713 are the same as waveguides 614, 619, 617, respectively, of the previous embodiment. Beam splitting prisms 701, 702 are the same as beam splitting prisms 601, 602, respectively, of the previous embodiment. Beam splitting prism 702 is separated from the optical resonator 703 by a dielectric beam splitting coating. The optical resonator 703 includes a first prism 704 and a second prism or reflector 761. The prisms 704, 761 are the same as prisms 611, 612, respectively. Precision glass spacer 705 is the same as precision glass spacer 604. Delay elements or reflectors 751, 706 are the same as delay elements 605, 606, respectively.

The optical components except reflector 751 and 761 are fixed (glued or soldered) on the substrate 710 made of a first material with a thermal expansion coefficient $\alpha_1$. Reflectors 751, 761 are fixed (for example, glued or soldered) on respective substrates 750, 760, where the substrates 750, 760 are made of a second material with a thermal expansion coefficient $\alpha_2$. The reflectors 751, 761 are mounted on one end of the substrates 750, 760, respectively, while on the other end the substrates 751, 761 are fixed (for example, glued or welded) on the substrate 710. By carefully selecting the materials and lengths for substrates 710, 750 and 760, the dependence of the air gaps $t_1$ and $t_2$ on temperature can be precisely controlled to compensate the optical path length change in the optical resonator and the MZI. For example, by selecting materials with $\alpha_2 > \alpha_1$, and selecting the correct length for the substrates 750 and 760, the air gaps $t_1$ and $t_2$ can be made to decrease with increasing temperature so as to compensate for the increase in optical path length in the optical resonator and the phase delay elements in the MZI caused by the dn/dT and thermal expansion of the optical glass.

Figure 8:
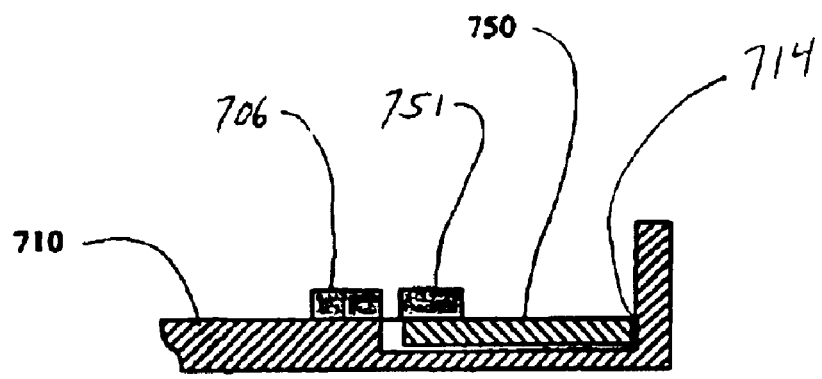
FIG. 8 is a partial cross-sectional view of the interleaver along section line 8—8 of FIG. 7.
Figure 9:
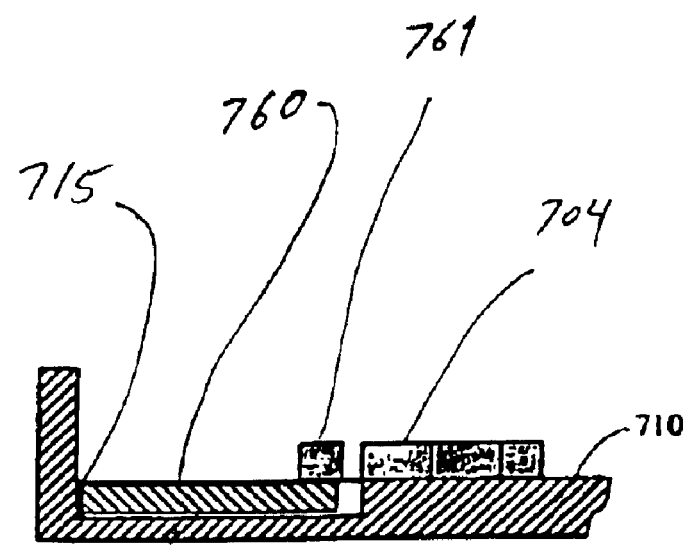
FIG. 9 is a partial cross-sectional view of the interleaver along section line 9—9 of FIG. 7.

FIG. 8 is a partial cross-sectional view along section line 8-8 of FIG. 7. FIG. 8 shows the substrate 750 attached to the substrate 710 at one of the ends 714 of the substrate 750. Likewise, FIG. 9 is a partial cross-sectional view along section line 9—9 of FIG. 7. FIG. 9 shows the substrate 760 attached to the substrate 710 at one of the ends 715 of the substrate 760.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A device comprising:
   a first fiber collimator;
   a first beam splitting prism;
   a spacer;
   a second beam splitting prism;
   a resonator cube;
   a dielectric beam splitting coating separating the resonator cube from the second beam splitting prism;
   a second fiber collimator; and
   a third fiber collimator, and wherein
   the spacer and the first fiber collimator straddle the first beam splitting prism, and wherein
   the first beam splitting prism and the second beam splitting prism straddle the spacer, and wherein
   the second fiber collimator and the spacer straddle the second beam splitting prism, and wherein
   the third fiber collimator and the spacer straddle the second beam splitting prism.

2. A device according to claim 1 wherein the spacer has a first index of refraction.

3. A device according to claim 2 wherein the spacer has a first thickness.

4. A device according to claim 3 wherein the resonator cube has a second index of refraction, and wherein the first index of refraction of the spacer is different than the second index of refraction of the resonator cube.

5. A device according to claim 4 wherein the resonator cube has an edge length dimension.

6. A device according to claim 5 wherein the first beam splitting prism is constructed from a first prism, a second prism, and a second dielectric beam splitting coating separating the first prism from the second prism.

7. A device according to claim 6 wherein the second beam splitting prism is constructed from a third prism, a fourth prism, and a third dielectric beam splitting coating separating the third prism from the fourth prism.

8. A device comprising:
   a first fiber collimator;
   a first beam splitting prism in optical communication with the first fiber collimator;
   a spacer in optical communication with the first beam splitting prism;
   a second beam splitting prism;
   a resonator cube;
   a dielectric beam splitting coating separating the resonator cube from the second beam splitting prism, the dielectric beam splitting coating in optical communication with the second beam splitting prism, the resonator cube, and the first beam splitting prism;
   a second fiber collimator in optical communication with the second beam splitting prism; and
   a third fiber collimator in optical communication with the second beam splitting prism, whereby
   an input optical signal having even and odd wavelengths enters the device at the first fiber collimator, and whereby
   an odd output signal having only odd wavelengths exits the second fiber collimator, and whereby
   an even output signal having only even wavelengths exits the third fiber collimator.

9. A device according to claim 8 wherein the spacer has a first index of refraction.

10. A device according to claim 9 wherein the spacer has a first thickness.

11. A device according to claim 10 wherein the resonator cube has a second index of refraction, and wherein the first index of refraction of the spacer is different than the second index of refraction of the resonator cube.

12. A device comprising:
    a first fiber collimator;
    a first beam splitting prism;
    a first delay element;
    a second delay element separated from the first delay element by a first distance;
    a spacer;
    a second beam splitting prism;
    a resonator cube comprised of a first ninety degree prism and a second ninety degree prism, and wherein the first ninety degree prism is separated from the second ninety degree prism by a second distance;
    a dielectric beam splitting coating separating the resonator cube from the second beam splitting prism;
    a second fiber collimator; and
    a third fiber collimator, and wherein
    the spacer and the first fiber collimator straddle the first beam splitting prism, and wherein
    the first beam splitting prism and the second beam splitting prism straddle the spacer, and wherein
    the second fiber collimator and the spacer straddle the second beam splitting prism, and wherein
    the third fiber collimator and the spacer straddle the second beam splitting prism, and wherein
    the first delay element and the second beam splitting prism straddle the spacer.

13. A device according to claim 12 wherein the spacer has a first index of refraction.

14. A device according to claim 13 wherein the spacer has a first thickness.

15. A device according to claim 14 wherein the resonator cube has a second index of refraction, and wherein the first index of refraction of the spacer is different than the second index of refraction of the resonator cube.

16. A device according to claim 15 wherein the resonator cube has an edge length dimension.

17. A device according to claim 16 wherein the first beam splitting prism is constructed from a first prism, a second prism, and a second dielectric beam splitting coating separating the first prism from the second prism.

18. A device according to claim 17 wherein the second beam splitting prism is constructed from a third prism, a fourth prism, and a third dielectric beam splitting coating separating the third prism from the fourth prism.

19. A device comprising:
   a first substrate;
   a first fiber collimator attached to the first substrate;
   a first beam splitting prism attached to the first substrate;
   a first delay element attached to the first substrate;
   a second delay element separated from the first delay element by a first distance;
   a spacer attached to the first substrate;
   a second beam splitting prism attached to the first substrate;
   a resonator cube comprised of a first ninety degree prism and a second ninety degree prism, and wherein the first ninety degree prism is separated from the second ninety degree prism by a second distance, the second ninety degree prism attached to the first substrate;
   a dielectric beam splitting coating separating the resonator cube from the second beam splitting prism;
   a second fiber collimator attached to the first substrate;
   a third fiber collimator attached to the first substrate;
   a second substrate having a free end and a fixed end, the fixed end of the second substrate attached to the first substrate, and the free end of the second substrate attached to the second delay element; and
   a third substrate having a free end and a fixed end, the fixed end of the third substrate attached to the first substrate, and the free end of the third substrate attached to the first ninety degree prism of the resonator cube.

20. A device according to claim 19 wherein the free end of the second substrate is separated from the fixed end of the second substrate by a third distance.

21. A device according to claim 20 wherein the free end of the third substrate is separated from the fixed end of the third substrate by a fourth distance.

22. A device according to claim 21 wherein the first substrate is constructed of a first material having a first coefficient of thermal expansion.

23. A device according to claim 22 wherein the second substrate is constructed of a second material having a second coefficient of thermal expansion, and wherein the first coefficient of thermal expansion of the first substrate is different than the second coefficient of thermal expansion of the second substrate.

24. A device according to claim 23 wherein the third substrate is constructed of the second material.

25. A device according to claim 24 wherein the spacer has a first index of refraction.

26. A device according to claim 25 wherein the spacer has a first thickness.

27. A device according to claim 26 wherein the resonator cube has a second index of refraction, and wherein the first index of refraction of the spacer is different than the second index of refraction of the resonator cube.

28. A device according to claim 27 wherein the resonator cube has an edge length dimension.

29. A device according to claim 28 wherein the first beam splitting prism is constructed from a first prism, a second prism, and a second dielectric beam splitting coating separating the first prism from the second prism.

30. A device according to claim 29 wherein the second beam splitting prism is constructed from a third prism, a fourth prism, and a third dielectric beam splitting coating separating the third prism from the fourth prism.

* * * * *